United States Patent
Moser et al.

(10) Patent No.: US 7,905,629 B2
(45) Date of Patent: Mar. 15, 2011

(54) SPOTLIGHT WITH USER-FRIENDLY FIXABLE ADJUSTABLE FOCUS

(76) Inventors: John Moser, Scottsdale, AZ (US); James Girard, Biose, ID (US)

( * ) Notice: Subject to any disclaimer, the term of this patent is extended or adjusted under 35 U.S.C. 154(b) by 435 days.

(21) Appl. No.: 12/124,904

(22) Filed: May 21, 2008

(65) Prior Publication Data

US 2009/0225547 A1 Sep. 10, 2009

Related U.S. Application Data

(63) Continuation-in-part of application No. 11/764,682, filed on Jun. 18, 2007, now Pat. No. 7,578,599.

(51) Int. Cl.
*F21S 8/00* (2006.01)
(52) U.S. Cl. .................. 362/277; 362/296.01; 362/187; 362/113
(58) Field of Classification Search ............. 362/296.01, 362/113, 197, 198, 199, 187, 277; 248/74.3; 411/301, 306
See application file for complete search history.

(56) References Cited

U.S. PATENT DOCUMENTS

| | | | |
|---|---|---|---|
| 4,586,117 | A | 4/1986 | Collins |
| 4,814,957 | A | 3/1989 | Dennis |
| 7,101,057 | B2 | 9/2006 | Parker et al. |
| D556,352 | S | 11/2007 | Moser |
| 2004/0190299 | A1* | 9/2004 | Chapman ............ 362/394 |
| 2004/0233670 | A1 | 11/2004 | Linde |
| 2004/0252508 | A1* | 12/2004 | Lin ................... 362/267 |
| 2007/0064415 | A1 | 3/2007 | Wood |

* cited by examiner

*Primary Examiner* — Evan Dzierzynski
(74) *Attorney, Agent, or Firm* — Feldman Gale, P.A.; Michael C. Cesarano

(57) ABSTRACT

The present invention is a spotlight with adjustable focus that has a focus fixing mechanism to prevent inadvertent changes to the focus of the light, while still allowing user-friendly intentional adjustment of the focus. The mounting collar of the reflector assembly rotates on helical threads on the neck of the lamp assembly so that the focus of the light may be adjusted. The focus is fixed in position by a plurality of ridges and valleys on the lamp assembly that mate with corresponding ridges and valleys in the collar of the reflector assembly. The collar of the reflector assembly is sufficiently flexible or expandable so that the focus of the lamp may be intentionally changed by applying sufficient rotational force to the reflector assembly. The collar is sufficiently rigid that the reflector assembly will not rotate as a result of incidental vibrations or movement.

4 Claims, 4 Drawing Sheets

SPOTLIGHT WITH USER-FRIENDLY FIXABLE ADJUSTABLE FOCUS

CROSS-REFERENCE TO RELATED APPLICATIONS

The present application claims priority benefit under 35 U.S.C. §119(e) of U.S. Utility patent application Ser. No. 11/764,682 filed Jun. 18, 2007. The disclosure of that application is incorporated herein by reference.

FIELD OF THE INVENTION

The present invention relates primarily to flashlights, spotlights, and handheld lamps powered by batteries.

BACKGROUND OF THE INVENTION

Spotlights and flashlights are available in various shapes and sizes that are well known in the art. Flashlights are typically powered by batteries of various sizes. Flashlights may use LED's, incandescent bulbs, fluorescent bulbs, or any other light emitting device as their light source. Some available flashlights have focusing features that allow the user to focus the beam of light to a desired concentration pattern. Typically, the focusing mechanism can be adjusted through the circumferential rotation of a ring located on the light assembly in relation to the body of the device. However, in order to maintain the focus of the light, the focusing mechanism must be prevented from rotating out of position. If a locking system is employed to prevent the focus of the light from changing, the locking system will have to be disengaged before the focus of the light may be altered. It may be cumbersome for a user to have to disengage a locking system just to alter the focus of the light, especially in low-light settings where a flashlight is likely to be used. In addition, there exist lamps in the prior art that employ detent/fixing mechanisms located on the external surface of the housing. These external mechanisms may not be protected from dirt and debris or physical damage, and have a tendency to break or lose effectiveness, resulting in a loss of one of the primary functions of the lamp.

SUMMARY OF THE INVENTION

The present invention is a focusable spotlight that allows its user to focus the light pattern to precisely the right position and then maintain that focus. Focusing is accomplished by rotating a reflector assembly on threads attached to a lamp assembly so that the parabolic reflector in the reflector assembly changes position in relation to the light source, thus changing the focus of the light pattern.

The present invention provides one or more protruding tabs on the lamp assembly that mate with a set of alternating ridges and valleys in the reflector assembly, and that fix the position of the reflector assembly, and thus the focus of the light. The mating of the protruding tabs with the alternating ridges and valleys prevents the focus of the light from changing involuntarily, as from vibrations or movement incidental to normal use, while still allowing the user to adjust the focus by applying sufficient rotational force to the reflector assembly.

Additionally, the present invention allows the user to adjust the focus of the light without having to physically interact with, or disengage any sort of focus locking or detent mechanism. The present invention also provides a durable and reliable means for fixing the focus of a light because of the enclosed nature of the ridges and valleys.

It is an objective of the present invention to provide a user-friendly focus adjustment and holding mechanism that can be adjusted and held in a fixed position simply by providing adequate rotational force to the reflector housing.

It is a further objective of the present invention to provide a more reliable focus holding mechanism than currently available alternatives that employ external mechanisms that may be easily deformed or broken.

It is a further objective of the present invention to protect the mated ridges and valleys, which allow the focus of the light to be maintained, from environmental dirt and debris by enclosing them within a housing as illustrated in the accompanying figures.

BRIEF DESCRIPTION OF THE DRAWINGS

The invention is illustrated by way of example, and not by way of limitation in the figures of the accompanying drawings, in which.

DETAILED DESCRIPTION OF THE INVENTION

Figure 1:
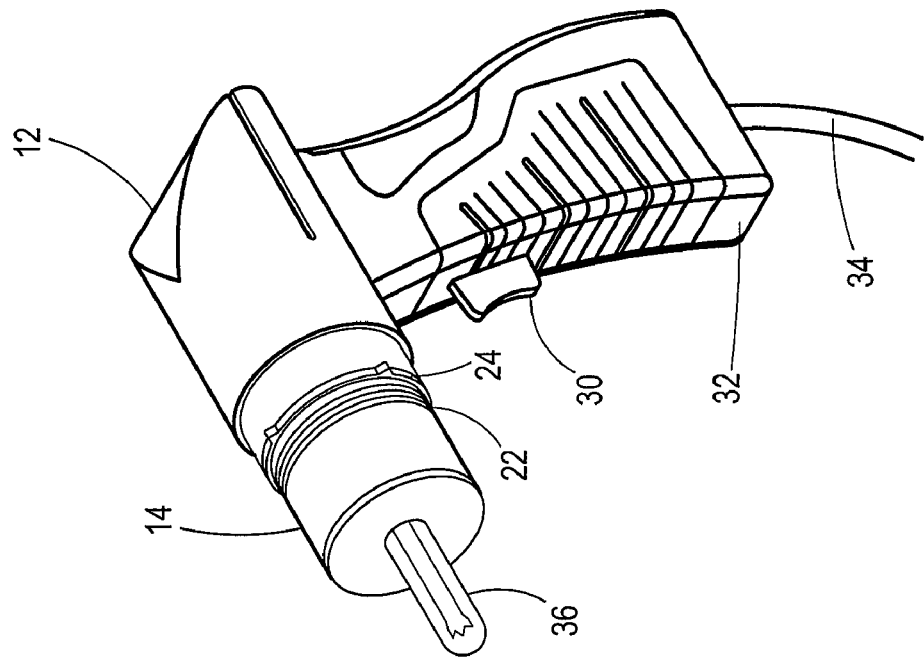
FIG. 1 is an isometric view of the present invention with the reflector housing and lamp housing detached.
Figure 1:
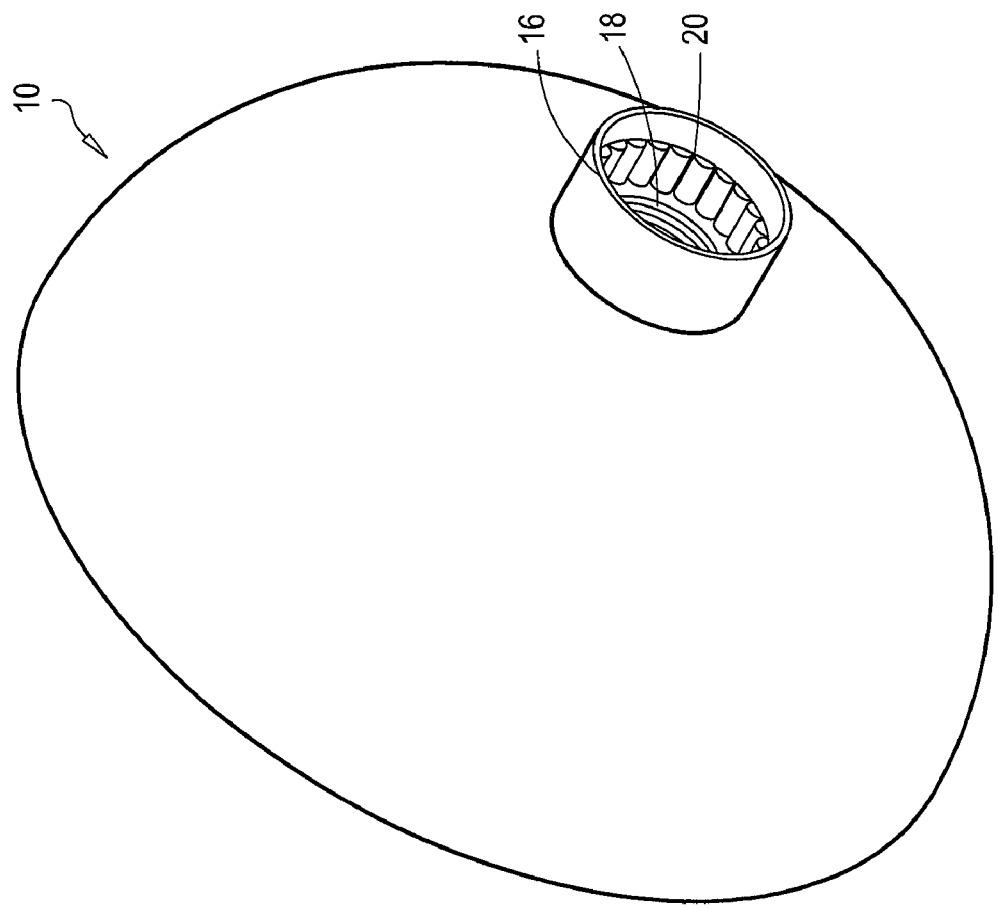

FIG. 1 is an isometric view of the present invention, which shows the reflector housing 10 detached from the lamp housing 12. The reflector housing 10 is mounted to the cylindrical mounting neck 14 of the lamp housing 12 by its resilient cylindrical collar 16, which has helical threads 18, and a plurality of alternating ridges and valleys 20, that are directed parallel to the axis of the resilient cylindrical collar 16, on its internal surface. The threads 18 on the resilient cylindrical collar 16 mate with corresponding helical focusing threads 22 on the cylindrical mounting neck 14, while the alternating ridges and valley's 20 on the internal surface of the resilient cylindrical collar 16 mate with the protruding tabs, which could be either rigid 24 or flexible 25, on the cylindrical mounting neck 14 to fix the focus of a light bulb 36 in a desired position in relation to the parabolic reflector.

Figure 3:
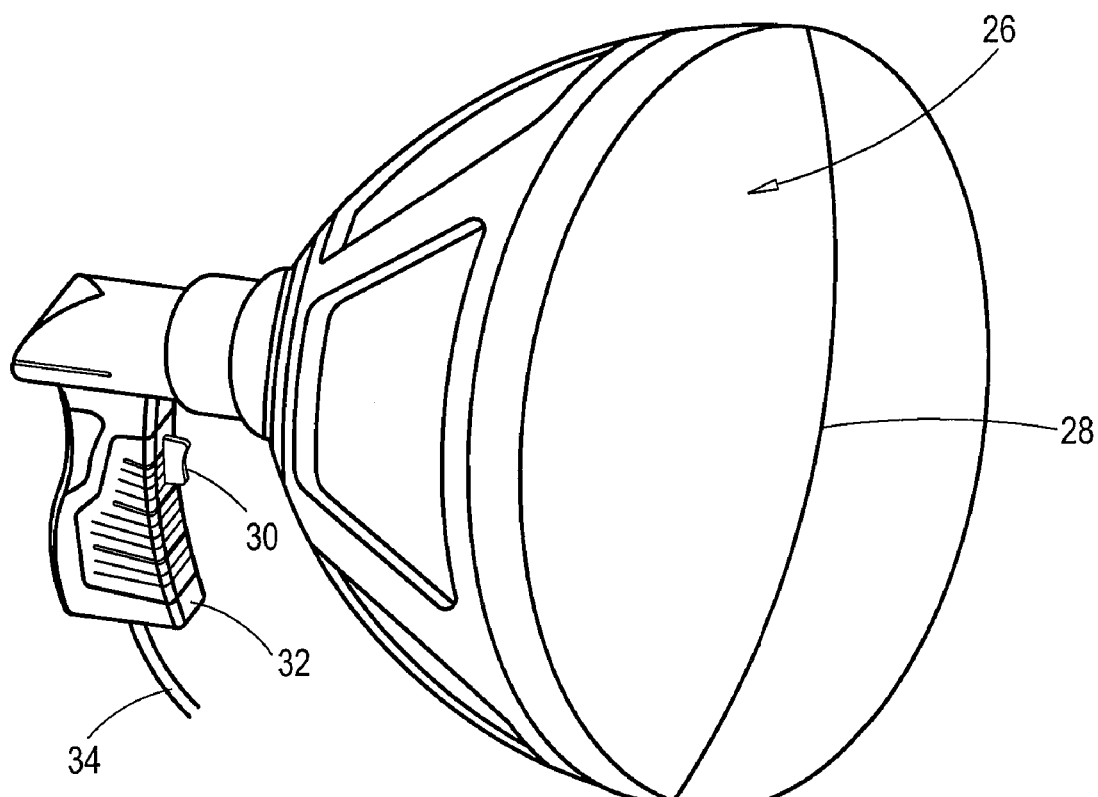
FIG. 3 is an isometric view of the present invention.
Figure 4:
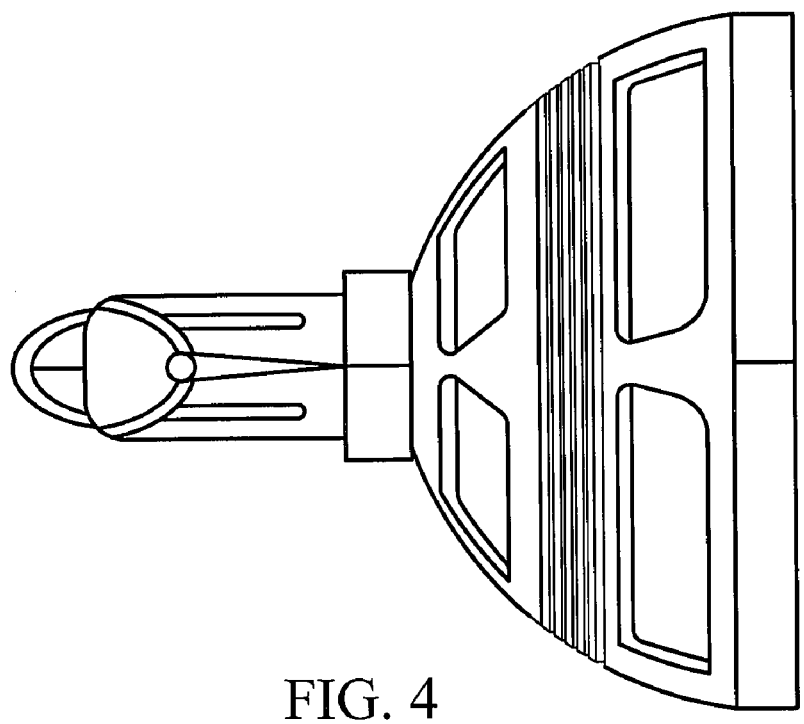
FIG. 4 is a top plan view of the present invention.
Figure 5:
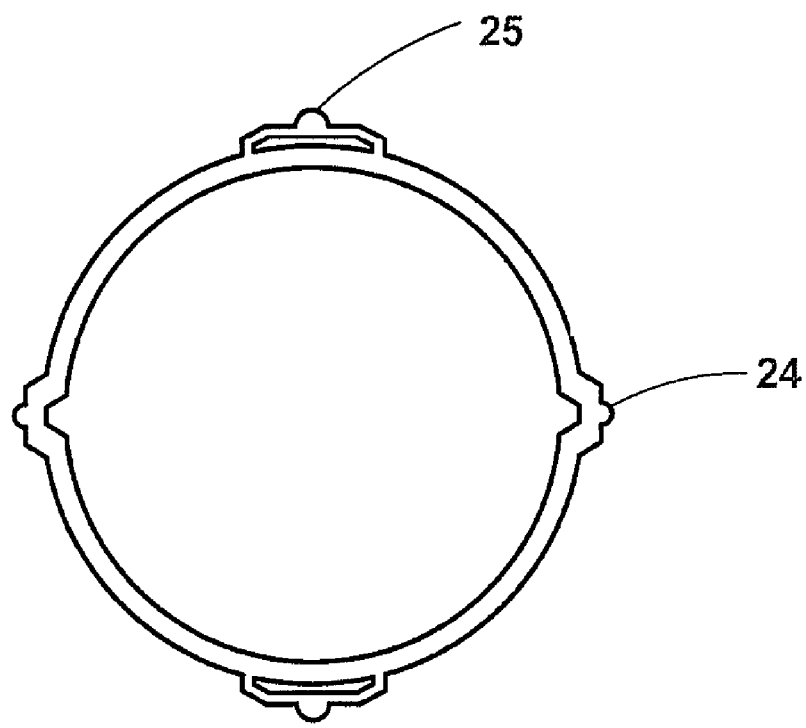
FIG. 5 is an elevational view of a ring that may be mounted on the lamp housing which contains the protruding tabs.
Figure 6:
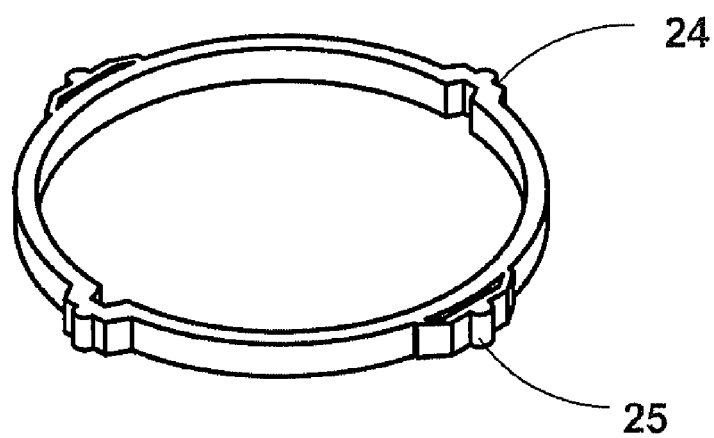
FIG. 6 is an isometric view of a ring that may be mounted on the lamp housing which contains the protruding tabs.

The light from the lamp may be focused by rotating the reflector housing 10 on the focusing threads 22 so that the parabolic reflector 26, located within the reflector housing 10, as shown in FIG. 3, moves either closer to or further away from the cylindrical mounting neck 14 and the light source located thereon, thus changing the focus of the light beam. In the preferred embodiment, the light source will be a removable light bulb 36 that is held within a socket at the end of the cylindrical mounting neck 14. Once the light beam is focused in the desired position, the ridges and valleys 20 on the internal surface of the resilient cylindrical collar 16 will be settled within the protruding tabs 24, 25 on the cylindrical mounting neck 14 to prevent further inadvertent rotation, thereby maintaining that focusing position. In alternative embodiments of the invention, the ridges 20, may be rounded in shape, or could have a "V" shape, or any other shape that will function correctly, as may be determined by one of ordinary skill in the art. Moreover, in alternative embodiments of the invention, the tabs 24, 25 may be physically integrated into the cylindrical mounting neck, or attached by interlocking tabs, or any other method that will function correctly, as may be determined by one of ordinary skill in the art.

The resilient cylindrical collar 16 is sufficiently flexible so that as a sufficient amount of force is applied to rotate the reflector housing, the collar 16 will expand slightly as the ridges 20 on the internal surface of the resilient cylindrical collar 16 move up and over the adjacent protruding tabs 24, 25 on the cylindrical mounting neck 14, and into the protruding tabs 24, 25 on the cylindrical mounting neck 14. Thus, the reflector housing 10 is rotated with respect to the lamp housing 12. The amount of rotational force required to adjust the focus in this manner is sufficient, as will be evident to one of ordinary skill in the art, to prevent any inadvertent changing of the focus, while still enabling user-friendly intentional adjustment.

Figure 2:
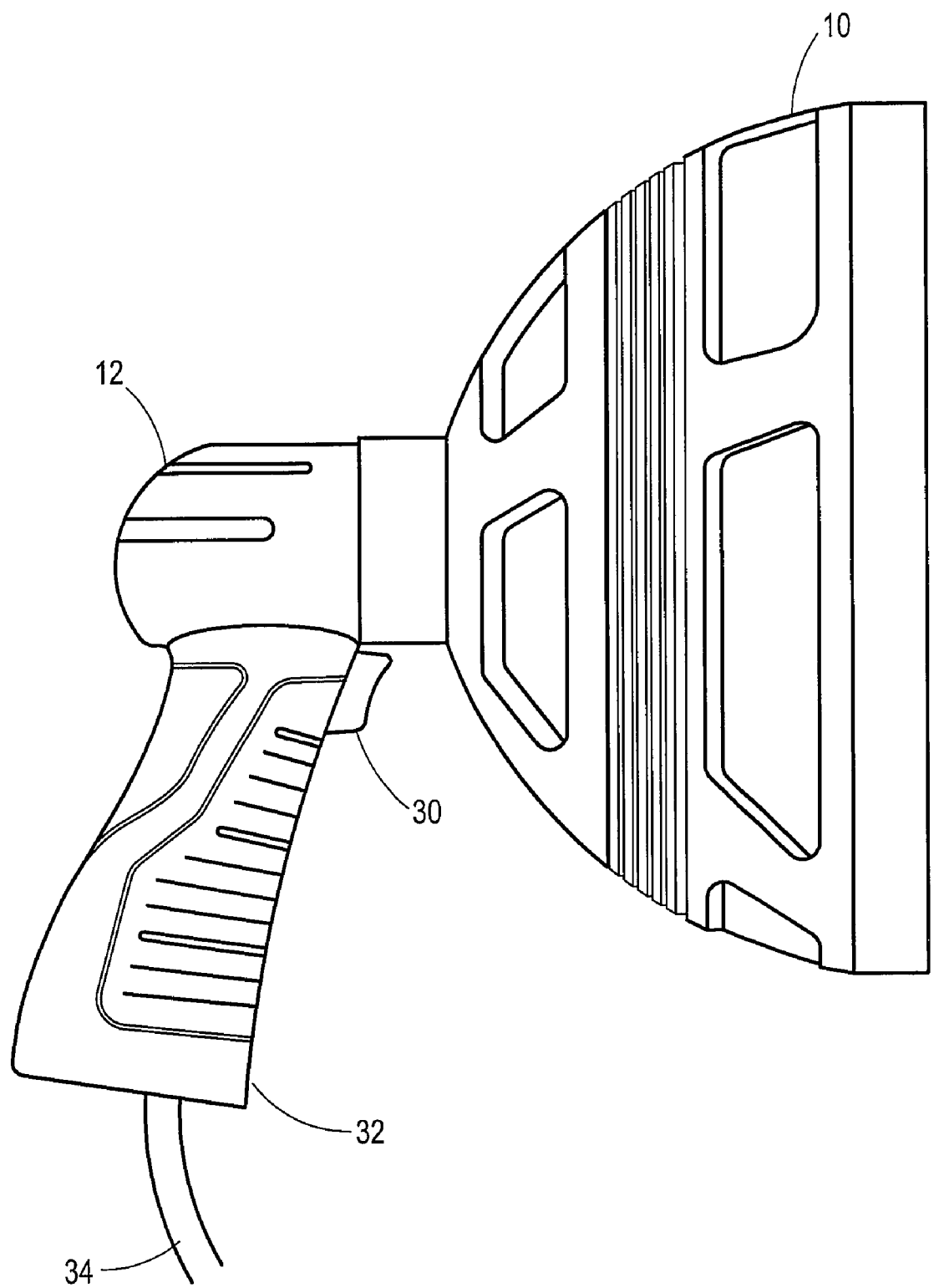
FIG. 2 is an elevational side view of the present invention.

In one embodiment of the invention, as seen in FIG. 2 and FIG. 3, a lens 28 is installed in the reflector assembly 10 to protect the parabolic reflector 26 and light source from damage, dirt, debris, moisture, and the like. The lens 28 may be manufactured with suitable characteristics to facilitate the focusing of the light. The lens 28 may be manufactured from glass, plastic, or any other suitable material.

In another embodiment, a switch 30 is mounted on the handle 32 to turn the power to the light source on and off. Additionally, the light may have power cables 34 that extend from the bottom of the handle 32 to connect to a power source, such as a battery. The light source of the present invention may be an incandescent light bulb, a halogen light bulb, a fluorescent light bulb, or any other suitable light emitting device, as will be evident to one of ordinary skill in the art.

In another embodiment of the invention, the spotlight may be mounted to the top of a car, or on a motorcycle, or all terrain vehicle for increased light at night, particularly in rural areas. The spotlight may also be mounted on a boat to increase visibility during nighttime boating. The present invention would maintain the focus of the light pattern even while the vehicle travels over rough terrain or through rough waters.

Although details of specific implementations and embodiments are described above, such details are intended to satisfy statutory disclosure obligations rather than to limit the scope of the following claims. Many changes may be made in the details of construction and the arrangement of components without departing from the spirit and scope of this disclosure. Thus, the invention is defined by the claims, not limited by the specific features described above.

What is claimed is:

1. A focusable lamp comprising:
   a lamp assembly, said lamp assembly comprising a handle, a cylindrical mounting neck, and a light source located at the distal end of said cylindrical mounting neck, said cylindrical mounting neck comprising one or more resilient protruding tabs located about the circumference of said neck, and helical focusing threads extending circumferentially about said neck; and
   a reflector assembly comprising a parabolic reflector held within said reflector assembly, a resilient cylindrical collar protruding rearwardly from said reflector assembly at the apex of said parabolic reflector, said collar having an internal surface comprising corresponding helical mating threads that extend circumferentially around the inside of said collar and mate with said focusing threads, said internal surface further comprising a plurality of alternating ridges and valleys extending circumferentially around the interior of said collar adjacent to the mating threads and resiliently contacting said one or more protruding tabs;
   wherein when sufficient rotational force is applied to said reflector assembly, said resilient one or more of said ridges slide over one or more of said resilient protrusions and when said rotational force is removed, said resilient one or more protrusions lodge between two ridges within one or more of said valleys to resist further rotation and cause said distance between said light source and said parabolic reflector to remain constant.

2. The focusable lamp of claim 1 wherein said light source comprises a light bulb mounted on said cylindrical mounting neck such that said light source emits light into the reflector assembly.

3. The focusable lamp of claim 1 wherein said reflector assembly further comprises a lens positioned opposite of the apex of the parabolic reflector.

4. The focusable lamp of claim 1 further comprising an operable switch on said handle to turn the light source on and off.

* * * * *